US012314716B2

(12) United States Patent
Covaci et al.

(10) Patent No.: US 12,314,716 B2
(45) Date of Patent: May 27, 2025

(54) COMPUTER-IMPLEMENTED SYSTEMS AND METHODS FOR SERIALISATION OF ARITHMETIC CIRCUITS

(71) Applicant: nChain Licensing AG, Zug (CH)

(72) Inventors: Alexandra Covaci, London (GB); Patrick Motylinski, London (GB); Simone Madeo, London (GB); Stephane Vincent, Luxembourg (LU); Craig Steven Wright, London (GB)

(73) Assignee: NCHAIN LICENSING AG, Zug (CH)

( * ) Notice: Subject to any disclaimer, the term of this patent is extended or adjusted under 35 U.S.C. 154(b) by 235 days.

(21) Appl. No.: 17/887,447

(22) Filed: Aug. 13, 2022

(65) Prior Publication Data
US 2023/0109846 A1 Apr. 13, 2023

Related U.S. Application Data

(63) Continuation of application No. 17/041,781, filed as application No. PCT/IB2019/052113 on Mar. 15, 2019, now Pat. No. 11,416,249.

(30) Foreign Application Priority Data

Mar. 27, 2018 (GB) .................................... 1804948

(51) Int. Cl.
*H04L 9/06* (2006.01)
*G06F 9/30* (2018.01)
(Continued)

(52) U.S. Cl.
CPC .......... *G06F 9/3001* (2013.01); *G06F 9/3826* (2013.01); *G06F 9/3836* (2013.01); *H04L 9/0643* (2013.01); *H04L 9/50* (2022.05)

(58) Field of Classification Search
CPC ............................... H04L 9/0643; H04L 9/50
See application file for complete search history.

(56) References Cited

U.S. PATENT DOCUMENTS 6,377,706 B1 4/2002 de Queiroz
8,302,041 B1 * 10/2012 Chan ..................... G06F 30/347
716/132
(Continued)

FOREIGN PATENT DOCUMENTS

WO 2011000799 A1 1/2011

OTHER PUBLICATIONS

"Computer-implemented system and method," United Kingdom Patent Application No. 1801753.3, filed Feb. 2, 2018, 28 pages.
(Continued)

Primary Examiner — Michael J Metzger
(74) Attorney, Agent, or Firm — Tarolli, Sundheim, Covell & Tummino LLP

(57) ABSTRACT

Techniques described herein may be utilized to serialise and de-serialise arithmetic circuits that are utilized in the execution of computer programs. The arithmetic circuit may be utilized to build a Quadratic Arithmetic Problem (QAP) that is compiled into a set of cryptographic routines for a client and a prover. The client and prover may utilize a protocol to delegate execution of a program to the prover in a manner that allows the client to efficiently verify the prover correctly executed the program. The arithmetic circuit may comprise a set of symbols (e.g., arithmetic gates and values) that is compressed to produce a serialised circuit comprising a set of codes, wherein the set of symbols is derivable from the set of codes in a lossless manner. Serialisation and de-serialisation techniques may be utilized by nodes of a blockchain network.

18 Claims, 7 Drawing Sheets

(51) Int. Cl.
  *G06F 9/38* (2018.01)
  *H04L 9/00* (2022.01)

(56) References Cited

U.S. PATENT DOCUMENTS

| | | | | |
|---|---|---|---|---|
| 2007/0277134 | A1* | 11/2007 | Zhang | G06F 30/3323 |
| | | | | 716/113 |
| 2009/0313596 | A1 | 12/2009 | Lippmann et al. | |
| 2009/0323563 | A1* | 12/2009 | Ho | H04B 7/0695 |
| | | | | 370/280 |
| 2010/0195739 | A1 | 8/2010 | Lu et al. | |
| 2016/0204795 | A1* | 7/2016 | Huang | H03M 13/6312 |
| | | | | 341/87 |
| 2017/0041606 | A1 | 2/2017 | Matsumura | |
| 2017/0142103 | A1 | 5/2017 | Bringer et al. | |
| 2017/0212968 | A1 | 7/2017 | Diao et al. | |
| 2017/0316119 | A1 | 11/2017 | Joseph et al. | |
| 2018/0083780 | A1* | 3/2018 | Alesiani | H04L 9/0816 |
| 2019/0295049 | A1* | 9/2019 | Karame | G06Q 20/0658 |

OTHER PUBLICATIONS

Antonopoulos, "Mastering Bitcoin—Unlocking Digital Cryptocurrencies," O'Reilly Media, Inc., Dec. 20, 2014, 282 pages.
Bootle et al., "Linear-Time Zero-Knowledge Proofs for Arithmetic Circuit Satisfiability," International Conference on the Theory and Application of Cryptology and Information Security, Dec. 3, 2017, https://eprint.iacr.org/2017/872.pdf, 54 pages.
Covaci et al., "Extracting Information from the CRS in a ZK Protocol on Blockchain," United Kingdom Patent Application No. 1719998.5, filed Nov. 30, 2017, 39 pages.
Covaci et al., "Logic Minimisation of C-like Smart Contracts for Optimised Verifiable Computation," United Kingdom Patent Application No. 1718505.9, filed Nov. 9, 2017, 38 pages.
Covaci et al., "Recording Verification Keys on the Blockchain," United Kingdom Patent Application No. 1720768.9, filed Dec. 13, 2017, 45 pages.
Delmolino et al., "Step by Step Towards Creating a Safe Smart Contract: Lessons and Insights from a Cryptocurrency Lab," International Conference on Financial Cryptography and Data Security, Feb. 26, 2016, 15 pages.
Gennaro et al., "Quadratic Span Programs and Succint NIZKs without PCPs," Annual International Conference on the Theory and Applications of Cryptographic Techniques, May 26, 2013, 20 pages.
Huffman, "A method for the construction of minimum-redundancy codes," Proceedings of the IRE 40(9):1098-101, Sep. 1952, 4 pages.
International Search Report and Written Opinion mailed Dec. 6, 2019, Patent Application No. PCT/IB2019/052113, 14 pages.
Juels et al., "The Ring of Gyges: Using Smart Contracts for Crime," Proceedings of the 2016 ACM SIGSAC Conference on Computer and Communications Security, Oct. 24, 2016, 32 pages.
Kerber, "Verifiable Computation in Smart Contracts," University of Edinburgh School of Informatics Computer Science 4th Year Project Report, published online Apr. 4, 2017 [retrieved May 2, 2018], https://git.drwx.org/bsc/proj-report/raw/branch/master/report.pdf, 49 pages.
Kosba et al., "Hawk: The Blockchain Model of Cryptography and Privacy-Preserving Smart Contracts," IEEE Symposium on Security and Privacy, May 22, 2016, 31 pages.
Nakamoto, "Bitcoin: A Peer-to-Peer Electronic Cash System," Bitcoin, Oct. 31, 2008, https://bitcoin.org/bitcoin.pdf, 9 pages.
Parno et al., "Pinocchio: Nearly Practical Verifiable Computation," IEEE Symposium on Security and Privacy, May 19, 2013, 16 pages.
Satoshi et al., "Connection Limits," Bitcoin Forum, Aug. 9, 2010, https:/bitcointalk.org/index.php?topic=741.0; prev_next=prev, 2 pages.
Shannon, "A Mathematical Theory of Communication," The Bell System Technical Journal 27(3):379-423 and 623-656, July, Oct. 1948, 55 pages.
UK Commercial Search Report mailed Oct. 1, 2018, Patent Application No. GB1804948.6, 5 pages.
UK IPO Search Report mailed Sep. 28, 2018, Patent Application No. GB1804948.6, 3 pages.
Wikipedia, "Arithmetic coding," Wikipedia the Free Encyclopedia, Mar. 24, 2018, https://en.wikipedia.org/w/index.php?title=Arithmetic_coding&oldid=832173421, 13 pages.
Wikipedia, "Huffman coding," Wikipedia the Free Encyclopedia, Feb. 24, 2018, https://en.wikipedia.org/w/index.php?title=Huffman_coding&oldid=827366029, 11 pages.
Wikipedia, "Space-time tradeoff," Wikipedia the Free Encyclopedia, Dec. 20, 2017, https://en.wikipedia.org/w/index.php?title=Space-time_tradeoff&oldid=816280979, 3 pages.
Yang et al., "An Approach to Graph and Netlist Compression," Data Compression Conference (dcc 2008), Mar. 25, 2008, https://ieeexplore.ieee.org/document/4483281, 10 pages.
Degermark M., et al., "IP Header Compression", Networking Working Group, Request for Comments: 2507, Category: Standards Track, Feb. 1999, 47 pages.
Adjeroh, Donald, et al., "The Burrows-Wheeler Transform", Springer, 2008, ProQuest Ebook Central, 33 pages.

\* cited by examiner

COMPUTER-IMPLEMENTED SYSTEMS AND METHODS FOR SERIALISATION OF ARITHMETIC CIRCUITS

CROSS REFERENCE TO RELATED APPLICATIONS

This application is a continuation of U.S. patent application Ser. No. 17/041,781, filed Sep. 25, 2020, entitled "COMPUTER-IMPLEMENTED SYSTEMS AND METHODS FOR SERIALISATION OF ARITHMETIC CIRCUITS," which is a 371 National Stage of International Patent Application No. PCT/IB2019/052113, filed Mar. 15, 2019, which claims priority to United Kingdom Patent Application No. 1804948.6, filed Mar. 27, 2018, the disclosures of which are incorporated herein by reference in their entirety.

FIELD OF INVENTION

This invention relates generally to techniques for reducing the data footprint used by arithmetic circuits (e.g., when stored on a disk or in memory), and more particularly to techniques for generating a serialised circuit from an arithmetic service by utilizing compression techniques described here. Arithmetic circuits may be compressed in a lossless manner to produce a serialised circuit which can, at a later point in time, be used to perfectly re-produce the original circuit. An arithmetic circuit may be used to produce a program whose execution can be delegated to one or more nodes of a distributed computing environment. A protocol may be used to ensure correct execution of the program wherein a first computer system delegates execution of the program to a second computer system. The invention is particularly suited, but not limited to, for use in a blockchain network.

BACKGROUND OF INVENTION

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention. The term "Bitcoin" is intended herein as including any protocol which is derived from or a variation of the Bitcoin protocol.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e., added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g., a permanent, tamper proof records of events, distributed processing etc.) while being more versatile in their applications.

One area of current research is the use of the blockchain for the implementation of "smart contracts". These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results.

SUMMARY OF INVENTION

Thus, it is desirable to provide a model for lossless compression and serialisation of arithmetic circuits to a bit stream. Serialising circuits may provide various advantages in the context of circuit templates (e.g., circuits or sub-circuits that are re-used) or standard circuits that need to be stored and retrieved. In this way, encoding, computing entities can achieve increased performance by obviating the need to repeatedly create an instance of a circuit or sub-circuit for multiple programs that have shared circuits or sub-circuits. An arithmetic circuit can be efficiently compressed using entropy coding on the most frequent elements in the data structure, such as the arithmetic operator types. Instructions for de-serialisation and de-compression may also be embedded in the bit stream, thereby enabling a recipient of a serialised circuit to reconstruct the original circuit in a lossless manner.

Such an improved solution has now been devised.

Thus, in accordance with the present invention there is provided systems and methods as defined in the appended claims.

In accordance with the invention there may be provided a computer-implemented method for a node of a blockchain network, the computer-implemented method being usable to reduce the data footprint of an arithmetic circuit and comprising: removing a first subset of data fields of a set of data fields associated with the arithmetic circuit, wherein the first subset of the data fields is obtainable from a second subset of the data fields of the set of the data fields, the first subset and the second subsets being disjoint sets; and applying an entropy coding scheme to the second subset to produce a compressed arithmetic circuit. The resulting compressed arithmetic circuit may be stored as data in volatile memory (e.g., RAM), data storage systems (e.g., hard disk drives) and more.

Preferably, the first subset of the data fields comprises identifiers of a set of inputs to the arithmetic circuit and the second subset comprises a cardinality of the set of inputs. The cardinality of a set (alternatively, the cardinal number of the set) may refer to the number of inputs in the set of inputs. Accordingly, the compressed circuit can be represented using fewer bits of data than an uncompressed circuit.

Preferably, the first subset of the data fields comprises identifiers of a set of gate outputs of the arithmetic circuit. Accordingly, the compressed circuit can be represented using fewer bits of data than an uncompressed circuit.

Preferably, the second subset comprises a set of gates and the first subset comprises a first input of a first gate of the set of gates. The order of the gates may be defined based on the order in which the gates are evaluated. Accordingly, the compressed circuit can be represented using fewer bits of data than an uncompressed circuit.

Preferably, the second subset comprises a set of gates and the first subset comprises a last output of a last gate of the set of gates. The order of the gates may be defined based on the order in which the gates are evaluated. Accordingly, the compressed circuit can be represented using fewer bits of data than an uncompressed circuit.

Applying the entropy encoding scheme to the second subset may comprise: determining a set of symbols from the second subset and assigning, to each symbol of the set of symbols, a corresponding code. In many cases, a symbol of the set of symbols is larger in size (e.g., bit-wise representation) than the symbol's corresponding code, but such need not be the case—for example, in a Huffman code, a symbol that occurs with low frequency may have a corresponding code that is larger in size.

Preferably, a symbol of the set of symbols is repeated at least twice in the second subset. The symbol, for example, may be a sequence of bits or operations that occurs more than once in a circuit.

Preferably, a length of a code is inversely proportional to a frequency of the symbol that corresponds to the code. Codes generated by an entropy encoding scheme may have variable lengths (e.g., some codes are larger in size than other codes), and shorter codes may be assigned to symbols that occur with greater frequency.

The codes corresponding to the symbols are generated according to an optimal prefix code such as a Huffman code.

Preferably, the method further comprises generating a serialised circuit, the serialised circuit comprising: a result based at least in part on applying the entropy coding scheme on the second subset; and a header data structure. The header data structure may include a version number and a total number of wires.

Preferably, the header data structure further comprises a bit-width usable to enable execution optimisations based at least in part on a target architecture.

Preferably, the version number indicates a coding scheme usable to determine symbols from codes.

Advantageously, unlike known interpreters and compilers, the invention provides an architecture-independent solution. Moreover, it does not require the use of a virtual machine (VM) to enable execution. An architecture-independent circuit may refer to a representation of a circuit that is not arranged for operation or use with a particular hardware or software architecture or platform. This is in contrast to prior art compilers and interpreters which are either architecture specific or require the use of a VM.

It is also desirable to provide a system, comprising: a processor; and memory including executable instructions that, as a result of execution by the processor, causes the system to perform any of the methods as claimed.

It is also desirable to provide a non-transitory computer-readable storage medium having stored thereon executable instructions that, as a result of execution by one or more processors of a computer system, cause the computer system to at least perform any of the methods as claimed.

BRIEF DESCRIPTION OF THE DRAWINGS

These and other aspects of the present invention will be apparent from and elucidated with reference to, the embodiment described herein. An embodiment of the present invention will now be described, by way of example only, and with reference to the accompany drawings, in which.

DETAILED DESCRIPTION

Figure 1:
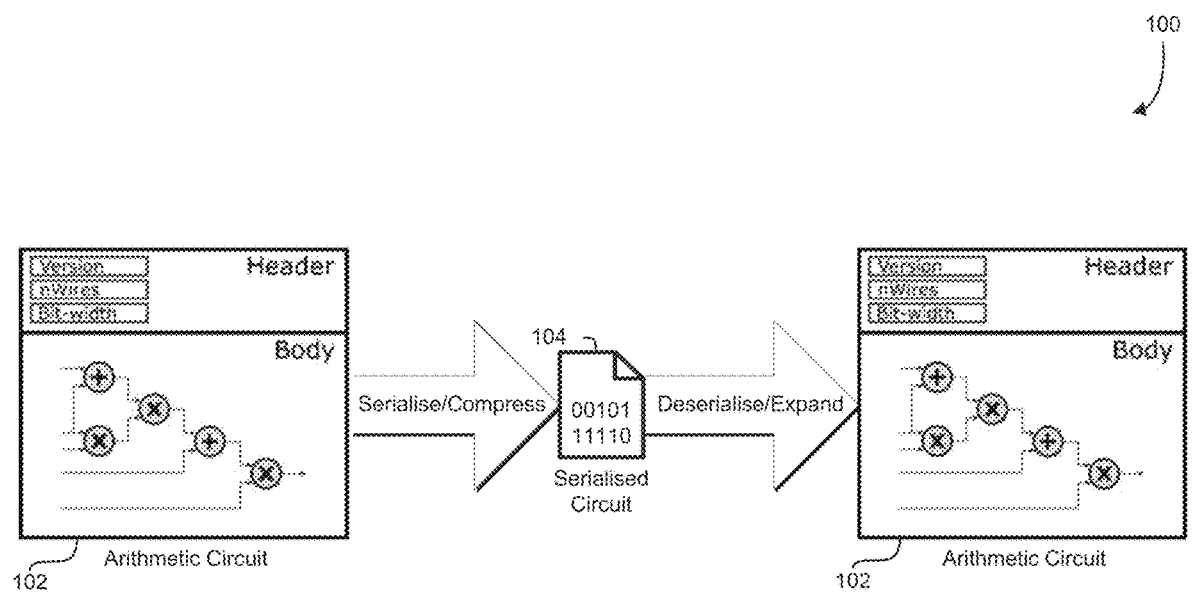
FIG. 1 illustrates a diagram of an arithmetic circuit and a serialised circuit that can be used to produce the arithmetic circuit.

We now provide an illustration of how the invention may be put into working practice according to one embodiment. The invention may be implemented in the context of a distributed computing environment wherein a first computing entity utilizes arithmetic circuits to generate programs whose execution can be delegated to computing entity of a distributed computing environment (e.g., a node of a blockchain network). Furthermore, the correct execution of the programs is computationally verifiable, such that a client computing entity that delegates execution of a program generated based at least in part on the arithmetic circuit is able to verify that the program was correctly executed by a worker computing entity. In this way, various efficiencies to distributed computing environments may be realised, including enabling the client computing entity to delegate and verify execution of a program to a computer system under the control of another entity.

As described in greater detail below, we describe a possible implementation for compressing and serialising an arithmetic circuit to a binary stream of data. The binary stream of data may be de-serialised and decompressed in a lossless manner. Various advantages of serialising circuits may be realised, such as reducing the data storage footprint of the circuit (e.g., by storing the serialised circuit in lieu of the arithmetic circuit). For example, in the context of a blockchain network, an arithmetic circuit or a program derived from the arithmetic may be encoded at least in part to a ledger of the blockchain network. By using techniques described herein to reduce the data storage footprint of an arithmetic circuit, the amount of data stored to a blockchain ledger may be reduced. Even small reductions to the data storage footprint of data stored in the blockchain are to be appreciated, as the blockchain ledger may be replicated by some or even all nodes of a blockchain network.

Specific structures or building blocks can be used to facilitate this conversion. In one or more embodiments, this representation can be seen as the first step for the construction of a comprehensive pipeline able to provide a distributed verifiable computation. The building blocks presented in this example are not intended to be an exhaustive list of all possible high-level language constructs handled by an embodiment of the invention. Moreover, alternate implementations of the presented examples can be provided. These fall within the scope of the person skilled in the art.

We now provide an illustrative embodiment of the invention. It is important to note, however, that this is an example of an application to which the invention may be put to use. The skilled person will understand that the invention can be put to advantageous use in other contexts and applications.

For our example, consider a protocol which allows users to generate applications using a Domain Specific Language (DSL). Once the application has been generated, its execution can be outsourced to untrusted parties (called "workers" or "provers"), while its correctness can be publicly verified. The protocol makes use of cryptographic primitives that ensure:

Completeness, i.e. the honest verifier will be convinced of the validity of the output if the protocol is correctly followed;

Soundness, i.e. no cheating prover can convince the honest verifier about the authenticity of the output;

Zero-knowledge, i.e. no cheating verifier learns anything other than the validity of the output.

The principal benefits of the protocol are:

Man-in-the-middle attacks are prevented since no communication between the participants is requested.

It makes hard for malicious nodes to tamper with the data due to the use of the blockchain technologies.

Trusted third parties such as trusted hardware devices are avoided

Contract validations do not imply code re-execution. Computations are not replicated by every node in the network. Instead, proofs of honest execution are stored in the public blockchain and used for validation purposes only.

Such a system would be capable of handling various types of applications, corresponding to various types of tasks and products. Due to its decentralized and distributed nature, the (Bitcoin) blockchain provides a well-suited environment for settling agreements between two (or more) parties.

Such a system needs to provide and facilitate programmability in a decentralized cryptocurrency system. However, it is recognised in the art that smart contract programming is an error-prone process. See Delmolino, K., et al. (2015). *Step by Step Towards Creating a Safe Smart Contract: Lessons and Insights from a Cryptocurrency Lab*, and Juels, A., et al. (2013). *The Ring of Gyges: Using Smart Contracts for Crime*.

Therefore, it would be advantageous to be able to use DSLs that make applications easier to write and to read by programmers, thus reducing error, reducing time, effort, cost and resources during the programming process. Ideally, non-specialist programmers would be able to write various types of applications without being required to implement cryptography. Instead, a compiler/interpreter would automatically compile the source code to a cryptographic protocol between the users and the blockchain. These are among the technical problems solved by the present invention.

FIG. 1 is an illustrative diagram 100 of an embodiment that can be implemented in accordance with the present disclosure. Techniques described herein may be utilized to serialise and de-serialise arithmetic circuits that are utilized in the execution of computer programs. The arithmetic circuit may be utilized to build a Quadratic Arithmetic Problem (QAP) that is compiled into a set of cryptographic routines for a client (e.g., key generation and verification) and a prover (e.g., computation and proof generation) in accordance with an embodiment. The client and prover may utilize a protocol to delegate execution of a program to the prover in a manner that allows the client to efficiently verify the prover correctly executed the program. A serialised circuit may be utilized to improve the operation of computer systems by reducing the computing resources (e.g., hard disk space) needed in connection with an arithmetic circuit. In an embodiment, the arithmetic circuit comprises information represented as a set of symbols (e.g., arithmetic gates and values) that is compressed to produce a serialised circuit comprising a set of codes, wherein the set of symbols is derivable from the set of codes in a lossless manner. Transmission of compressed circuit may improve the effective data transmission bandwidth of computer systems by enabling a greater number of circuits to be transmitted. For example, if a compressed circuit reduces the size of an arithmetic circuit by 50%, the effective data transmission bandwidth may be doubled, since up to twice as many compressed arithmetic circuits may be transmitted using the same number of bytes (it should be noted that the actual data transmission bandwidth improvement may be less than double, accounting for data overhead such as packet headers that may not be compressed). Reducing the data footprint of an arithmetic circuit may reduce computer hardware requirements associated with the use of the arithmetic circuit, such as reducing the amount of short-term memory (e.g., RAM) data storage, and/or data bandwidth utilized by a computer system that uses, stores, or otherwise interacts with circuits as described herein. Transmission of compressed circuit may improve the effective data transmission bandwidth of computer systems by enabling a greater number of circuits to be transmitted. For example, if a compressed circuit reduces the size of an arithmetic circuit by 50%, the effective data transmission bandwidth may be doubled, since up to twice as many compressed arithmetic circuits may be transmitted using the same number of bytes (it should be noted that the actual data transmission bandwidth improvement may be less than double, accounting for data overhead such as packet headers that may not be compressed). Reducing the data footprint of an arithmetic circuit may reduce computer hardware requirements associated with the use of the arithmetic circuit, such as reducing the amount of short-term memory (e.g., RAM) data storage, and/or data bandwidth utilized by a computer system that uses, stores, or otherwise interacts with circuits as described herein.

Generally, an arithmetic circuit C comprises wires that carry values from a field F and connect to logical and/or arithmetic gates. In an embodiment, the circuit C can be represented by a set of data fields that includes arithmetic gates, input wires, and output wires. The circuit may further comprise a header that includes information such as a version number, a total number of wires, and a bit-width $n_{bit}$ that allows execution optimisations depending on the target execution environment (e.g., processor architecture). Compression of an arithmetic circuit may be achieved by removing data fields that are determinable from other fields, applying entropy coding schemes, and combinations thereof. Various types of simplification rules may be used as part of a compression routine based on the format in which the arithmetic circuit is encoded. For example, some information may not be required, such as wire identifiers for inputs, wire identifiers of output gates, a first input of a first gate, and a last output wire identifier may compressed (e.g., not explicitly encoded as part of the serialised circuit), or any combination thereof.

In various embodiments, an entropy coding or encoding scheme is applied to the arithmetic circuit or a portion thereof (e.g., based on the simplification rules described above). An entropy coding may be utilized to produce a variable-length code table for the serialisation of source symbols. A Huffman coding may be utilized to generate a code table in which source symbols that occur with greater frequency are encoded using shorter codes, and source symbols that occur less frequently are encoded using longer codes—the length of a code may be inversely proportional to the frequency that a source symbol or sequence occurs. Using these techniques, the arithmetic circuit can be compressed to a serialised circuit that requires less computing resources for storage in a long-term data storage medium (e.g., a hard disk drive) and short-term data storage (e.g., random access memory).

As described above, a Huffman code may be utilized to generate a code table. A Huffman code refers to a particular type of optimal prefix code that can be used to achieve lossless data compression. The output from a Huffman algorithm may be a variable-length code table (e.g., a codebook) for encoding a source symbol, e.g., a character or a command in a file. The algorithm, in an embodiment, derives the table from the estimated or measured probability or frequency of occurrence (weight) for each possible value from the source symbol: more common symbols are generally represented using fewer bits than less common symbols. In an embodiment, Huffman coding can be efficiently implemented to find a code in time linear to the number of input weights wherein the input weights are in a sorted order. This strategy may be optimal among methods encoding symbols separately. Huffman coding may use a specific method for choosing the representation for each symbol, resulting in a prefix code, i.e., the bit string representing some particular symbol is never a prefix of the bit string representing any other symbol.

Given a set of symbols $\{a_0, a_1, \ldots, a_{n-1}\}$ from an alphabet A with size n and their weights $\{p_0, p_1, \ldots, p_{n-1}\}$ usually proportional to probabilities, a tree with minimum weighted path length from the root is required. The output code $C(P)=\{c_0, c_1, \ldots, c_{n-1}\}$ is the tuple of binary codewords with minimum weighted path length $L(C)$.

As defined by Shannon's source coding theorem, the information content h (in bits) of each symbol $a_i$ with non-null probability is $h(a_i)=\log_2(1/p_i)$. The entropy H (in bits) is the weighted sum, across all symbols $a_i$ with non-zero probability $p_i$, of the information content of each symbol:

$$H(A) = \sum_{p_i>0} p_i h(a_i) = -\sum_{p_i>0} p_i \log_2 p_i$$

The entropy is a measure of the smallest codeword length that is theoretically possible for the given alphabet with associated weights. In general, a Huffman code does not need to be unique: the set of Huffman codes for a given probability distribution is a non-empty subset of the codes minimizing L(C) for that probability distribution.

The serialised circuit can be used to derive the original arithmetic circuit using an expansion or decompression routine in a lossless manner. It should be noted "lossless" in this context refers to a type of compression algorithm wherein source data is perfectly derivable from the compressed data. In the context of digital compression, lossless compression may refer to each bit a source bit stream being derivable from compressed data comprising a set of symbols. Conversely, lossy compression may refer to a type of compression algorithm in which the compressed data is not able to derive each bit of a source bit stream from the compressed data—an example of lossy compression is the MP3 audio encoding format.

Figure 2:
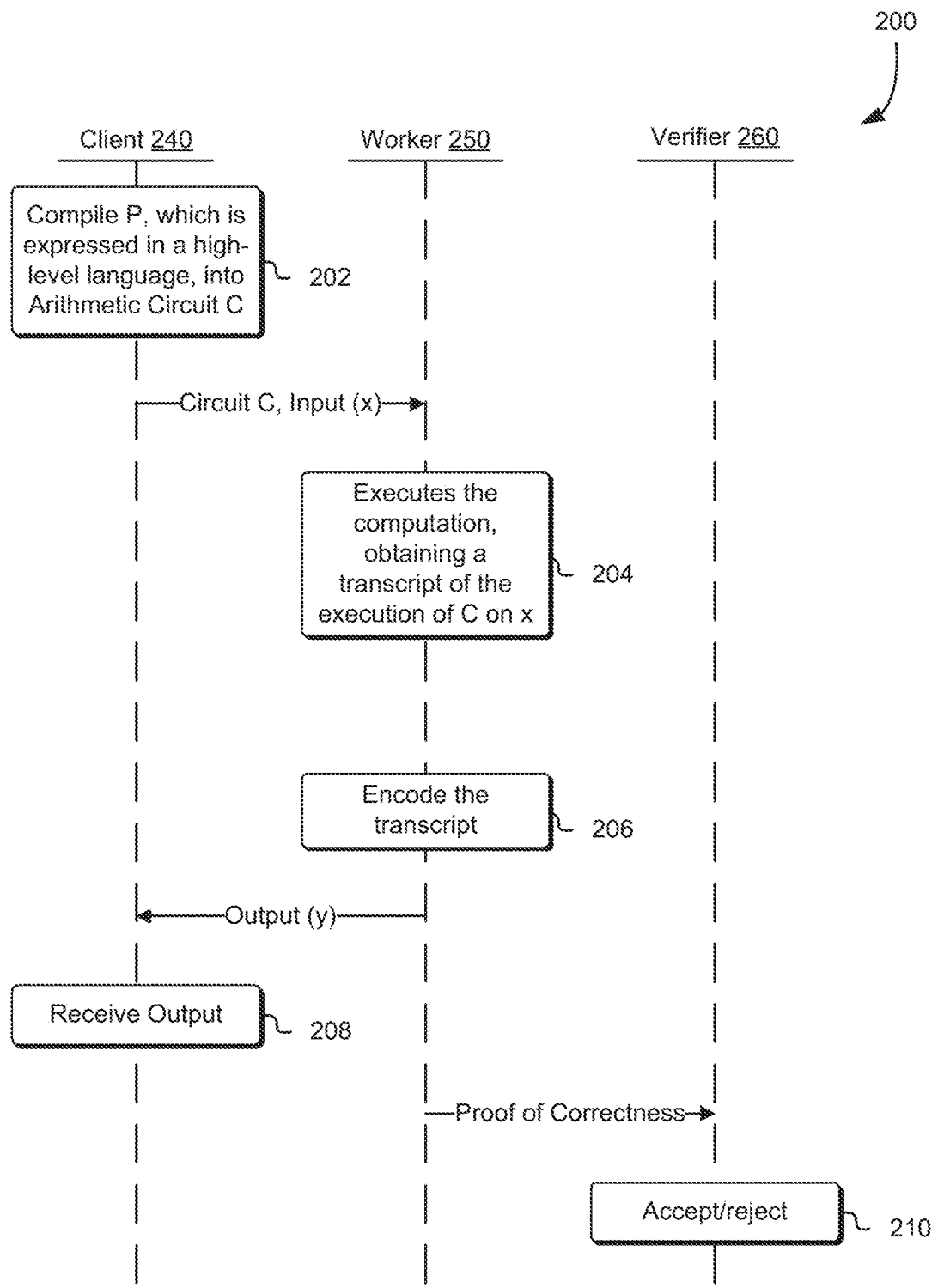
FIG. 2 is a diagram illustrating an example of a swim diagram of verifiable computation and actors involved in an embodiment of the present disclosure.

FIG. 2 is a diagram illustrating an example of a swim diagram 200 of verifiable computation and actors involved in an embodiment of the present disclosure. As illustrated in FIG. 2, the diagram 200 of verifiable computation may include a client node 240, a worker (e.g., prover) node 250, and a verifier node 260 involved in performing steps in a verifiable computation protocol in an embodiment of the present disclosure. In embodiments, one or more of the client node 240, the worker node 250, or the verifier node 260 are nodes in a blockchain network.

In an embodiment, a setup phase involves writing contracts in a domain-specific language (DSL). An interpreter, which may be the client node 240, takes as input the source code and produces an arithmetic circuit $\mathcal{C}$ which consists of "wires" that carry values from a field $\mathbb{F}$ and connect to addition and multiplication gates. Note that arithmetic circuit itself may be a DAG, rather than a hardware circuit, and the wires may be the edges in the DAG. However, it is contemplated that the arithmetic circuit could be embodied in a physical circuit having wires and logic gates. In 202, the client node 240 compiles a computation $\mathcal{P}$ written in a GPL into an arithmetic circuit $\mathcal{C}$. In the embodiment, the client node 240 supplies the arithmetic circuit C and the input x to the worker node 250.

From the circuit $\mathcal{C}$, an embodiment of the present disclosure can generate a quadratic program Q that includes a set of polynomials that provides a complete description of the original circuit C. Then, public parameters may be generated to be used by the worker node 250 and the verifier node 260 in performing and verifying the quadratic program.

In 204, the worker node 250 executes the circuit C or the quadratic program Q on the input x and claims that the output is $\mathcal{y}$. In some embodiments, the worker node 250 (i.e., the prover) is expected to obtain a valid transcript for $\{\mathcal{C}, x, \mathcal{y}\}$; thus, in 206, the worker node 250 encodes the transcript. In some examples, a valid transcript for $\{\mathcal{C}, x, \mathcal{y}\}$ is an assignment of values to the circuit wires such that the values assigned to the input wires are those of x, the intermediate values correspond to the correct operation of each gate in C, and the values assigned to the output wire(s) is $\mathcal{y}$; if the claimed output is incorrect (i.e., $\mathcal{y} \neq \mathcal{P}(x)$), then a valid transcript for $\{\mathcal{C}, x, \mathcal{y}\}$ does not exist.

In 208, the worker node 250 provides the output $\mathcal{y}$ to the client node 240. In embodiments, a public evaluation key EK and the public verification key VK are derived using a secret value s selected by or from the client node 240. In the embodiments, the worker node 250 uses these public keys to evaluate the computation on a particular input x. In embodiments, the output $y$, the values of the internal circuit wires, and EK are used to produce the proof-of-correctness π. The proof π can be stored on the blockchain and verified by multiple parties (e.g., the verifier node 260) without requiring the worker node 250 to separately interact with the multiple parties. In this manner, a verifier node 260 can validate the payment transaction in 210 using the public verification key VK and the proof it, thereby validating the contract.

A verifiable computation is a technique that allows the generation of proofs of computation. In an embodiment, such a technique is utilized by a client to outsource, to another computing entity referred to herein as a worker, the evaluation of a function f on an input x. In some cases, the client is computationally limited so that it is infeasible for the client to perform the evaluation of the function (e.g., the expected runtime of the calculation using computing resources available to the client exceeds a maximum acceptable threshold), although such need not be the case, and the client may, generally, speaking, delegate evaluation of the function f on the input x based on any suitable criterion, such as computational runtime, computational cost (e.g., the financial cost of allocating computing resources to perform the evaluation of the function), and more.

A worker, in an embodiment, is any suitable computing entity such as a blockchain node as described in greater detail elsewhere in the present disclosure. In an embodiment, a worker (e.g., a blockchain node) evaluates the function f on input x and generates an output y and a proof π of the correctness of the output y that can be verified by other computing entities such as the client as described above and/or other nodes of the blockchain network. Proofs, which may also be referred to as arguments, can be verified faster than doing the actual computational—accordingly, computational overhead can be reduced (e.g., reducing power overhead and the cost associated with powering and running computing resources) by verifying the correctness of the proof instead of re-computing the function f over input x to determine the correctness of the output generated by the worker described above. In zero-knowledge verifiable computation the worker provides an attestation to the client that the worker knows an input with a particular property.

An efficient variant of a zero-knowledge proof of knowledge is zk_SNARK (Succinct Non-interactive ARgument of Knowledge). In an embodiment, all pairings-based zk-SNARKs include a process where the worker computes a number of group elements using generic group operations and the verifier checks the proof using a number of pairing product equations. in an embodiment, the linear interactive proof works over a finite field and the worker's and verifier's message include, encode, reference, or otherwise include information usable to determine vectors of field elements.

In an embodiment, systems and methods described herein allow miners (e.g., nodes) of a blockchain to perform a computation (e.g., evaluation of function f on input x) once and generate a proof that can be used to verify correctness of the output wherein evaluating correctness of the proof is computationally less expensive than evaluating the function. In this context, the cost (i.e., how expensive) of operations and tasks may refer to the computational complexity of performing the operation or task. In an embodiment, computational complexity refers to the average computational cost or the worst-case computational cost of performing the sorting algorithm—for example, a heapsort algorithm and a quicksort algorithm both have an average computational cost of O(n log n), but quicksort has a worst-case computational cost of $O(n^2)$ whereas heapsort has a worst-case computation cost of O(n log n). In an embodiment, the average computational cost and/or the worst-case computational cost of evaluating the function f on input x is worse than that of evaluating correctness of the proof. Accordingly, the use of systems and methods described herein are highly advantageous and, may, for example, allow for more computationally expensive contracts to be run as such contacts would not increase the time required to validate the blockchain proportionally. Further advantages may include reduction in power consumption of verifier systems, thereby improving the efficiency of verifier computer systems and reducing the energy costs associated with running such verifier computer systems in evaluating correctness of proofs.

In an embodiment, a verification key $V_K$ or portions thereof can be extracted from public parameters generated in a setup phase of a zero-knowledge protocol and used together with a proof it, and the input/output data to verify the alleged proof of correctness computation provided by a worker. For example, as described in greater detail above and below, systems and methods that allow a locking script secures the verification key $V_K$ from alteration and checks the validity of the proof it, allowing the execution of a zero-knowledge protocol on blockchain during transaction validation. Accordingly, the present disclosure presents systems and methods to execute the verification phase using blockchain scripts (e.g., in a Bitcoin-based network) for storing the elements used in the verification of the computation.

Figure 3:
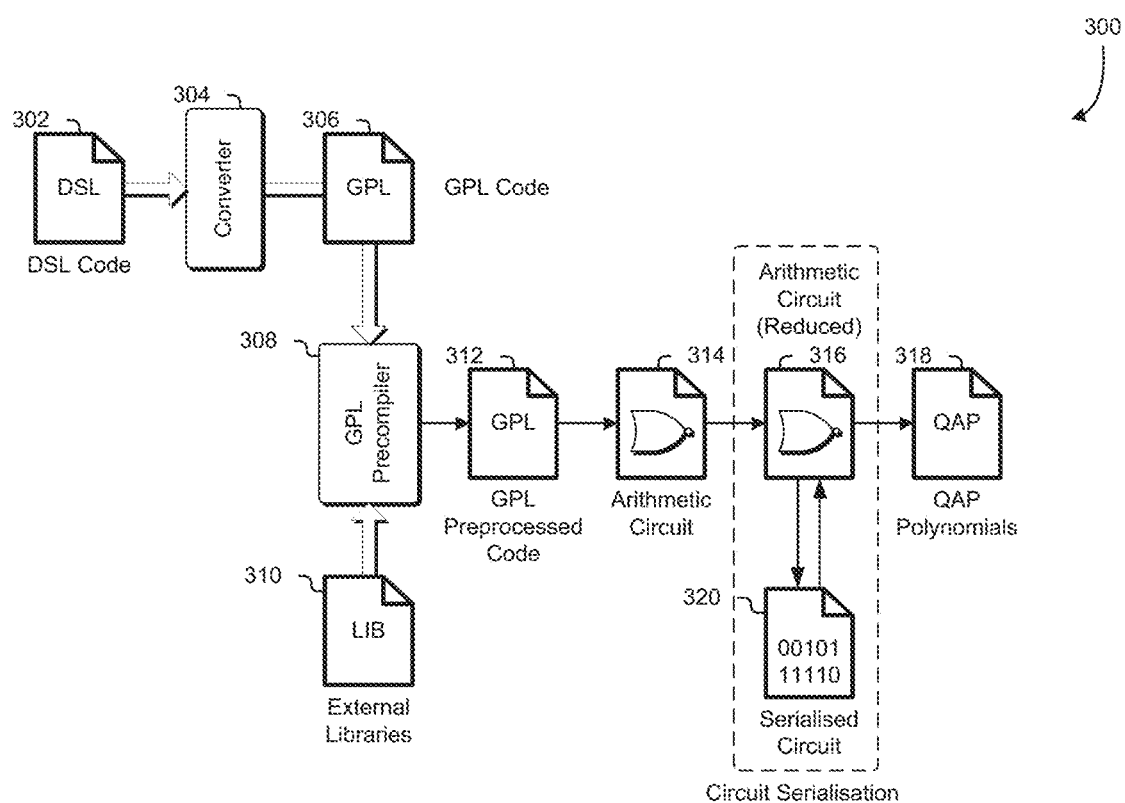
FIG. 3 illustrates an example of the workflow from domain-specific language (DSL) code to a quadratic arithmetic program (QAP) in accordance with an embodiment of the present disclosure.

FIG. 3 illustrates an example 300 of the workflow from domain-specific language (DSL) code to a quadratic arithmetic program (QAP) in accordance with an embodiment of the present disclosure. Specifically, FIG. 3 depicts DSL code 302 that is converted by a converter 304 into GPL code 306. A GPL precompiler 308 (also known as a pre-processor) incorporates external libraries 310 referenced by the GPL code 306 to produce GPL pre-processed code 312. The GPL pre-processed code 312 is transformed into an arithmetic circuit 314, which is optimised to produce a reduced arithmetic circuit 316 that is compressed to a produce a serialised circuit 320 from which QAP polynomials 318 are derived.

In an embodiment, the domain-specific language (DSL) code 302 is an application written in a formal language having precise semantics. In embodiments, the DSL code 302 includes a set of conditions, and the outcome of the DSL code 302 depends on fulfilment of the set of conditions. An example of an application (e.g., smart contract) is an insurance contract that takes, as input, a premium of an insuree and potential compensation to the insuree by an insurer. In the event the insuree suffers a loss (e.g., fulfilment of a first condition) during the term of the smart contract, execution of the smart contract distributes the premium to the insurer and distributes the compensation for the loss to the insuree. On the other hand, in the event the insuree does not suffer a loss during the term of the smart contract, execution of the smart contract distributes the premium to the insurer and returns the potential compensation to the insurer.

In an embodiment, the converter 304 is a software program that, as a result of execution, receives a set of conditions, such as the DSL code 302, written in a DSL and translates the DSL code into GPL source code, such as the GPL code 306. In an embodiment, the GPL code 306 is a GPL program, such as a C++ program, that contains the code defined in the DSL code 302. In some examples, a general-purpose programming language or "general-purpose language" (GPL), in contrast to a DSL, is broadly applicable.

Examples of general-purpose programming languages include Ada, ALGOL, Assembly language, BASIC, Boo, C, C++, C#, Clojure, COBOL, Crystal, D, Dart, Elixir, Erlang, F #, Fortran, Go, Harbour, Haskell, Idris, Java, JavaScript, Julia, Lisp, Lua, Modula-2, NPL, Oberon, Objective-C, Pascal, Perl, PHP, Pike, PL/I, Python, Ring, RPG, Ruby, Rust, Scala, Simula, Swift, and Tcl. C++, which may be referred to in embodiments of the present disclosure, is a general-purpose programming language with imperative, object-oriented and general programming features, while also providing facilities for low-level memory manipulation. It should be noted in the context of FIG. 3, that "code" may alternately refer to executable code (e.g., object code), source code, both, either, or combinations thereof based on the context in which described.

In an embodiment, the GPL precompiler 308 is a computer-executable program that processes the GPL code 306 and the required external libraries 310 to produce the stand-alone GPL pre-processed code 312. In embodiments, the GPL precompiler 308 evaluates constant expressions and registers symbols found in the GPL code 306.

In an embodiment, the external libraries 310 are collections of pre-written subroutines, functions, classes, containers, values, and/or variable types utilised by the GPL code 306 by invocation. For example, by invoking the external libraries 310, the GPL code 306 gains the functionality of that library without having to implement the functionality itself.

In an embodiment, the GPL pre-processed code 312 includes a set of expressions and operators. The operators may include arithmetic operators (e.g., addition (+), multiplication (*), etc.), comparison operators (e.g., less than (<), equality (==), greater than or equal to (>=) etc.), conditional statements (e.g., if-then (?, :)), or logic operators (e.g., AND (&&), OR (||), NOT (!), XOR ($\oplus$), etc.). In some embodiments, the main function is produced to have a predefined name and format.

In an embodiment, the arithmetic circuit 314 is a DAG over a set of variables. In an embodiment, every node of the DAG with an indegree of zero is an input gate representing a variable (e.g., $x_i$), and every other node of the DAG is a sum gate (+) or a product gate (×). In embodiments, every gate (node) has an outdegree of one, so the underlying graph is a directed tree. In embodiments, the arithmetic circuit 314 has two measures of complexity: size and depth. In some examples, a "size" of an arithmetic circuit is based on a number of gates within the arithmetic circuit 314. In some examples, "depth" of the arithmetic circuit is based on the length of the longest directed path within the arithmetic circuit.

In an embodiment, the reduced arithmetic circuit 316 is a reduced or minimised directed acyclical graph (DAG) that can be used to determine the outcome of a set of conditions, such as those specified in the DSL code 302, given a set of inputs. In some embodiments the reduced arithmetic circuit 316 is a minimised (i.e., reduced to the smallest degree) arithmetic circuit. In some embodiments, the most optimal arithmetic circuit may not necessarily be the smallest arithmetic circuit (e.g., certain larger arithmetic circuit may be evaluated more quickly than larger arithmetic circuits depending on the number and types of arithmetic operations in the circuit), and in such embodiments the reduced arithmetic circuit 316 is an optimised (e.g., for maximum speed, less memory usage, most efficient processor utilisation, etc.), but not necessarily minimised, arithmetic circuit. The reduced arithmetic circuit 316 may be generated using techniques described in UK patent application number GB 1718505.9.

An arithmetic circuit such as the reduced arithmetic circuit 316 may be compressed according to techniques described herein to generate a serialised circuit 320. The serialised circuit 320 may be used in case of code templates or standard applications that need to be stored and retrieved. By utilizing a serialised circuit 320, parties can obviate the need to create an instance of the circuit from a GPL every time a new application is created, thereby improving the efficiency of a protocol in which clients and provers re-use certain code templates or portions thereof. The serialised circuit 320 may be generated using entropy coding on the most frequent elements in the data structure, such as the arithmetic operator types. instructions for de-serialisation and de-compression (e.g., a codebook for mapping serialised codes to source symbols) may be embedded in a serialised bit stream that enables a recipient of a serialised circuit to reconstruct the source circuit.

Figure 4:
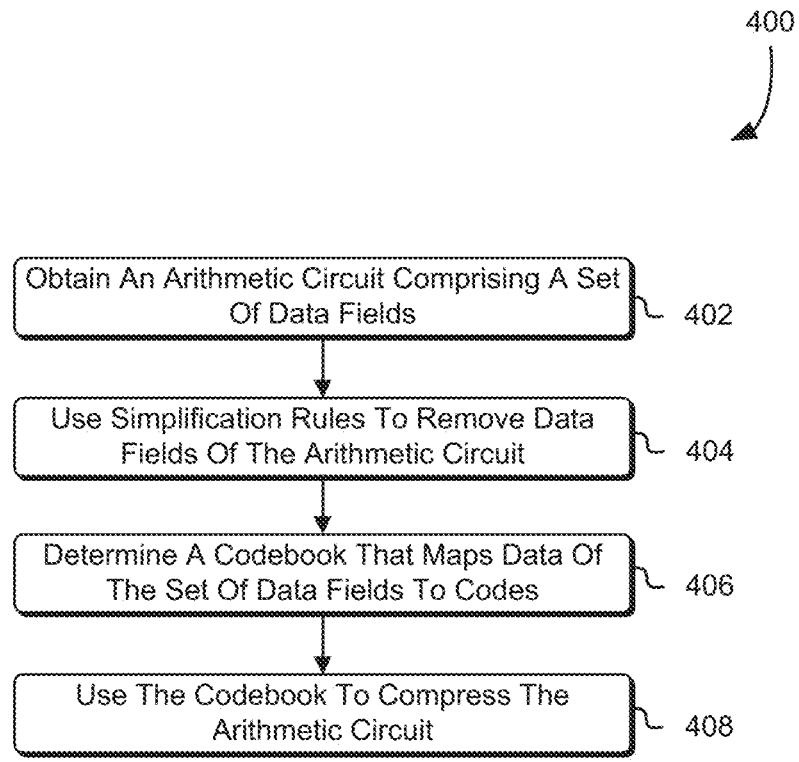
FIG. 4 illustrates a process for reducing the size of an arithmetic circuit, in accordance with an embodiment.

In an embodiment, the QAP polynomials 318 are one or more expressions comprising variables and coefficients expressed in a mathematical formula that provides a complete description of the original arithmetic circuit (e.g., arithmetic circuit 314 of FIG. 4). In embodiments, the polynomials of the QAP polynomials are defined in terms of their evaluations at the roots of the arithmetic circuit such as described in Gennaro, R. et al., *Quadratic Span Programs and Succint NIZKs without PCPs* (2013). In embodiments, the QAP polynomials are encoded into a locking script of a blockchain transaction as a representation of the smart contract. In embodiments, the locking script, upon execution, receives a set of parameter values (e.g., as a result of execution of a locking script), which are input as variables into the QAP polynomials to cause the result of the smart contract to be determined.

In embodiments, the GPL precompiler 308 produces the GPL pre-processed code 312, which may be an arithmetic circuit comprised of arithmetic gates. Note, however, that complex arithmetic circuits also embed logic submodules because of conditional and flow control statements.

FIG. 4 illustrates a process 400 for reducing the size of an arithmetic circuit. In an embodiment, the arithmetic circuit has a header that is encoded with or in association with a body. In an embodiment, the body of the circuit contains the wire identifiers of the gates and the gate types. The header may include information such as metadata associated with the body. In an embodiment, the arithmetic circuit is converted into a binary stream of data characterised by a measurement of entropy that approaches theoretical limits as defined by Shannon's source coding theorem. In some cases, the serialised circuit refers to the binary data stream, and has a higher entropy value than that of the arithmetic circuit. "Entropy" as described in this disclosure refers to entropy according to principles of information theory described in Shannon, C., *A Mathematical Theory of Communication* (1955).

The process 400 may be performed by any suitable computer system, such as those described in connection with FIG. 2. The circuit may be compressed and optimised by the client described in FIG. 2, or another computing entity, such as a worker that is delegated a task to serialising an arithmetic circuit. Given a generic circuit, the system identifies a list of global parameters. Senders and receivers in the serialisation scheme may exchange the following information: a version number, which in some embodiments includes additional information such as a coding scheme or codebook used to serialise the circuit; the total number of wires N; the bit-width $n_{bit}$; and combinations thereof.

In an embodiment, a system implementing the process 400 includes memory storing executable code that, if executed be one or more processors, causes the system to obtain 402 an arithmetic circuit which may be presented by a set of data fields. In an embodiment, the set of data fields include gates or operators, and wires that represent inputs and outputs. It should be noted that a wire may simultaneously be an output of a first gate and an input to another gate. A wire may also be both an input and output to a gate.

The system may use simplification rules to remove data fields of the arithmetic circuit 404. The simplification rules may be utilized to remove a first subset of data fields of the arithmetic circuit that are derivable from the remaining data fields, which may be referred to as a second subset of the arithmetic circuit's data fields. The first subset and the second subset may be disjoint sets that have no elements in common based on a characteristic of the data fields of the arithmetic circuit. Every data field of the arithmetic circuit can be classified as either a calculated field or a stored field, such that calculated fields are assigned to the first subset and stored fields are assigned to the second subset. It may be the case that a data field cannot be simultaneously characterised as both a calculated field and a stored field. A calculated field, in an embodiment, refers to a data field that can be derived from one or more stored fields. Generally speaking, this concept may be explained using an illustrative example: if there exists respective data fields that store the start time, end time, and duration of a time interval, then the end time can be identified as a calculated field whereas the start time and duration are stored fields, since the end time can be determined from one or more stored fields (e.g., EndTime=StartTime+Duration). Of course, in this example, it is also possible to represent the duration as a calculated field and the start and end times as stored fields (e.g., Duration=EndTime−StartTime). As noted above, none of the fields are simultaneously both a calculated field and stored field, but rather one or the other based on a representation that may be chosen programmatically (e.g., selected by the execution of an algorithm) or by a user.

In an embodiment, the system identifies one or more data fields of the set of data fields that can be removed based at least in part on making a determination of whether the data field is derivable from other data fields of the set. As a first example, a simplification rule may allow for wire identifiers of the inputs to be removed because starting from $id_0$, the first $n_{inputs}$ identifiers are reserved for the inputs. Therefore, the value $n_{inputs}$ is sufficient to determine that the identifiers from $id_0$ to $id_{n_{inputs}-1}$ are input identifiers. The inputs may be automatically incremented such that the first input is assigned $id_0$, the second input is assigned the $id_1$, and so on.

Figure 5:
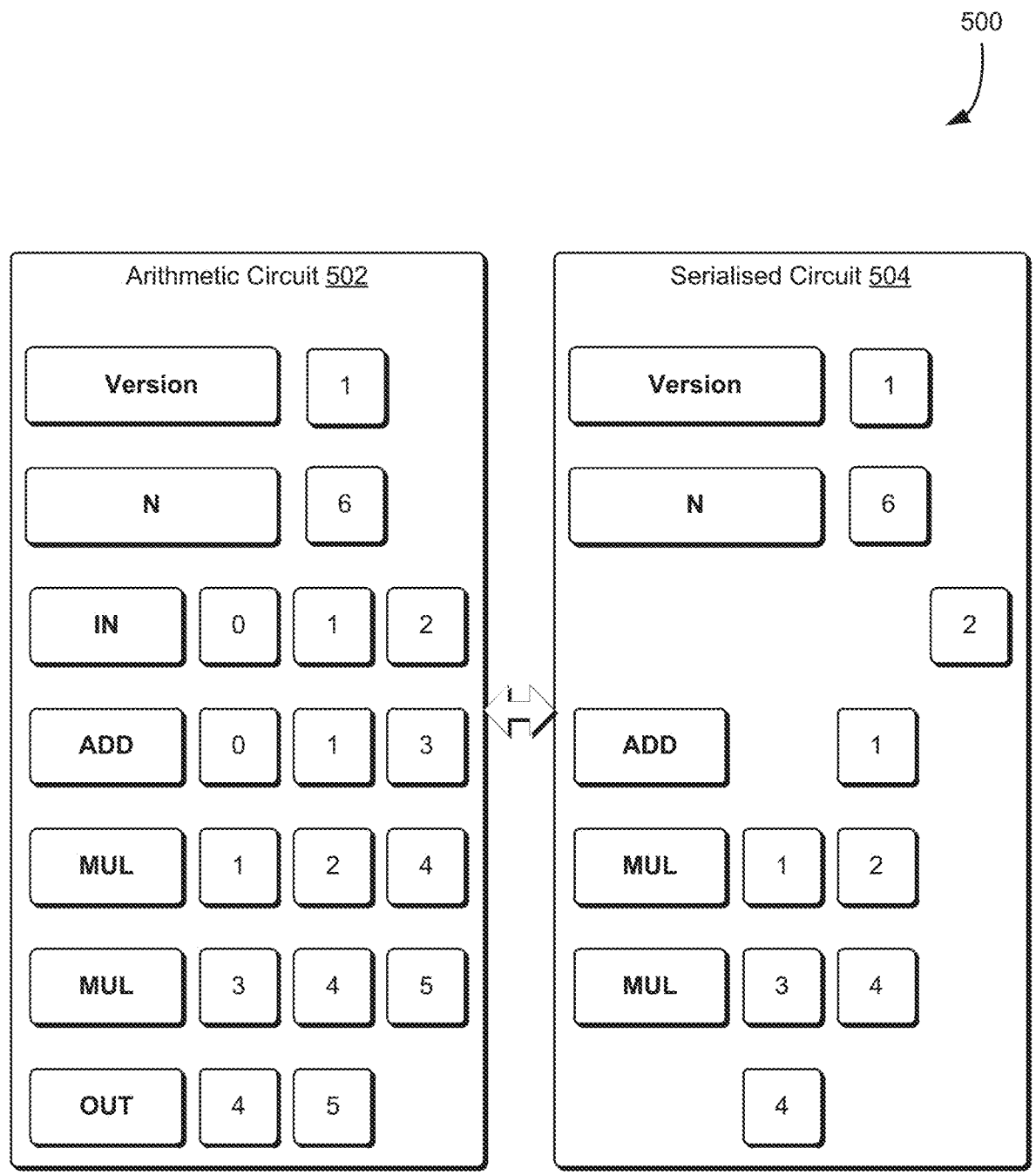
FIG. 5 illustrates a diagram of an arithmetic circuit and a corresponding serialised circuit according to an embodiment.

Additional simplification rules may exist. As a second example, the wire identifiers of the output gates may be removed so that, starting from $id_{n_{inputs}}$, every wire identifier of output gates is automatically incremented. For instance, if the circuit includes two gates only, the output of the first gate is characterised by $id_{n_{inputs}}$ while the output of the second gate is characterised by $id_{n_{inputs}+1}$. The order of the gates may be the sequential order of the arithmetic operations as specified by an interpreter such as an interpreter described in accordance with FIG. 2. The interpreter may be implemented using techniques described in UK patent application number GB 1801753.3. As a third example, the first input of the first gate (e.g., with ordering determined by the interpreter) is assigned $id_0$ by default. As a fourth example, the last output wire identifier is not required because, given the total number of wires N, $id_{N-1}$ is an output wire by default. Embodiments may implement none, all, or a portion of the example simplification rules described. FIG. 5 illustrate an example of an arithmetic circuit that applies the described simplification rules. It should be noted that such simplification rules as described above are merely illustrative and that various embodiments may implement some or all simplification rules, and that others simplification rules may be known to one skilled in the art.

Entropy coding may be applied to the arithmetic circuit to reduce the amount of data needed to encode portions of the circuit that are heavily repeated (e.g., the arithmetic operations). The system may, in some cases, determine 406 a codebook that maps data of the set of data fields to a set of codes. A Huffman coding may be used to produce a variable-length code table for the serialisation of source symbols. Generally speaking, given a set of M different source symbols, which may include the operation types defined for the arithmetic circuit, a probability $p_i$ is specified for each symbol i, $0 \leq i < M$. In an embodiment, a binary tree is generated taking the two least probable symbols and putting them together to form a new symbol. For example, if $p_a$ and $p_b$ are the two least probable symbols, they form a new symbol $p_{ab}$ such that $p_{ab}=p_a+p_b$. This process is repeated until there is just one symbol. The tree may be read backwards, assigning different codes to different branches. The codes may be assigned according to a Huffman coding scheme. It should be noted that the resulting tree may have leaf nodes having different tree depths—in such cases, symbols having higher probabilities are, generally speaking, closer to the root than symbols having comparatively lower probabilities. In this way, symbols that occur with greater frequency can be encoded using fewer bits than symbols that occur less frequently. In other words, in an embodiment, the length of the codes inversely proportional to the frequency of the symbol.

The binary tree and the symbol codes may vary according to the value of M and the individual symbol probabilities $p_i$, $0 \leq i < M$. For instance, if M is a power of 2, $p_i=2p_{i+1}$ and $p_{M-2}=p_{M-1}=2^{-M+1}$, then the total number of bits $S_{ops}$ required to encode the arithmetic operations is the following:

$$S_{ops} = \sum_{i=0}^{M-3} \omega_i(i+1) + 2(M-1)(\omega_{M-2} + \omega_{M-1})$$

Therefore, the compression ratio R for the encoding of arithmetic operations is the following:

$$R = \frac{n_o \sum_{i=0}^{M-1} \omega_i}{\sum_{i=0}^{M-3} \omega_i(i+1) + 2(M-1)(\omega_{M-2} + \omega_{M-1})}$$

Because of the linearity between p and $\omega$, i.e. $\omega_{M-2} = \omega_{M-1} = 1$ and $\omega_i = 2\omega_{i+1}$, $0 \leq i < M-1$, the equation above can be simplified as follows:

$$R = \frac{n_o M(M+1)}{\frac{1}{6}(2M^3 - 9M^2 + 13M - 6) + 4(M-1)} = \frac{6 n_o M(M+1)}{2M^3 - 9M^2 + 37M - 30}$$

When M>5, normalised ratio $R/n_0$ is less than 1, i.e., we are not actually compressing respect to $n_0$. The bigger M, the higher the compression ratio. In the manner described above, the arithmetic circuit may be compressed 408. In an embodiment, the compressed circuit is a serialised bit stream of data that encodes a representation of the circuit (e.g., a simplified and/or coded version of the original circuit as described above). In an embodiment, the serialised circuit comprises a body that encodes the representation of the circuit and a header that comprises one or more of the following: a version number, a total number of wires, a bit-width $n_{bit}$, a codebook, or any combination thereof. In some cases, the codebook is selected from a plurality of codebooks and the appropriate codebook can be selected based on querying the version number. For example, a first codebook of a list of codebooks may correspond to version 1, a second codebook of the list corresponds to version 2, and so on. Codebooks may, in an embodiment, be pre-generated.

FIG. 5 illustrates a diagram 500 of an arithmetic circuit 502 and a serialised circuit 504 according to an embodiment. The serialised circuit 504 illustrated in FIG. 5 may be a compressed version of the arithmetic circuit produced using a set of simplification rules. A lossless compression routine may be applied to the arithmetic circuit 502 to generate the serialised circuit 504; a lossless de-compression routine may be applied to the serialised circuit 504 to perfectly reproduce the serialised circuit 504 (e.g., bit-for-bit accuracy).

As illustrated in FIG. 5, an example arithmetic circuit may include header metadata comprising: version information, a field N indicating the number wires, and identifiers for the inputs (0, 1, 2) and the outputs of the circuit (4, 5). It should be noted that some wires may be neither inputs of the circuit nor outputs of the circuit (e.g., wires that are intermediate inputs or outputs of the circuit). Information in the header need not be encoded at the head of a data structure and need not even be encoded contiguously, as illustrated in the arithmetic circuit 502 of FIG. 5, where the output data is encoded at the end of the data structure. The arithmetic circuit further encodes data fields for gates that are followed by a set of inputs and outputs. For example:

ADD θ 1 3 as illustrated in the arithmetic circuit 502 refers to an addition gate that adds the values of the wires corresponding to identifiers $id_0$ and $id_1$ and generates the output to the wire corresponding to identifier $id_3$. As a second example, MUL 1 2 4 refers to a multiplication gate that multiplies the values of the wires identified as identifiers $id_1$ and $id_2$ and produces a product at the wire identified by $id_4$. An uncompressed arithmetic circuit 502 may, accordingly, be represented as:

| VERSION 1 |
| --- |
| N 6 |
| IN 0 1 2 |
| ADD 0 1 3 |
| MUL 1 2 4 |
| MUL 3 4 5 |
| OUT 4 5 |

The arithmetic circuit 502 may be compressed to a serialised circuit 504 by applying simplification rules. A first simplification rule may be that the wire identifiers of the inputs are not required if the number of inputs is encoded. The number of inputs may alternatively refer to the cardinal number or cardinality of the set of inputs. For example, the inputs (0, 1, 2) illustrated above have a cardinality of 2.

Accordingly, following this simplification rule, the arithmetic circuit is compressed to the following:

| VERSION 1 |
| --- |
| N 6 |
| 2 |
| ADD 0 1 3 |
| MUL 1 2 4 |
| MUL 3 4 5 |
| OUT 4 5 |

A second simplification rule may be that the wire identifiers of the output gates are not required because wire identifiers of output gates can be automatically incremented starting from $n_{inputs}$. Accordingly, following the first and second simplification rules, the arithmetic circuit is compressed to the following:

| VERSION 1 |
| --- |
| N 6 |
| ADD 0 1 |
| MUL 1 2 |
| MUL 3 4 |
| 4 5 |

A third simplification rule may be that the first input to the first gate is not required because the first identifier is assigned to that wire by default. Accordingly, following the first, second, and third simplification rules, the arithmetic circuit is compressed to the following:

| VERSION 1 |
| --- |
| N 6 |
| 2 |
| ADD 1 |
| MUL 1 2 |
| MUL 3 4 |
| 4 5 |

A fourth simplification rule may be that the last output wire identifier is not required because the last wire identifier is defined to be an output wire by default. Accordingly, following the first, second, third, and fourth simplification rules, the arithmetic circuit is compressed to the following:

| VERSION 1 |
| --- |
| N 6 |
| 2 |
| ADD 1 |
| MUL 1 2 |
| MUL 3 4 |
| 4 |

It should be noted that the serialised circuit 504 may be further compressed, such as by using entropy coding techniques.

Figure 6:
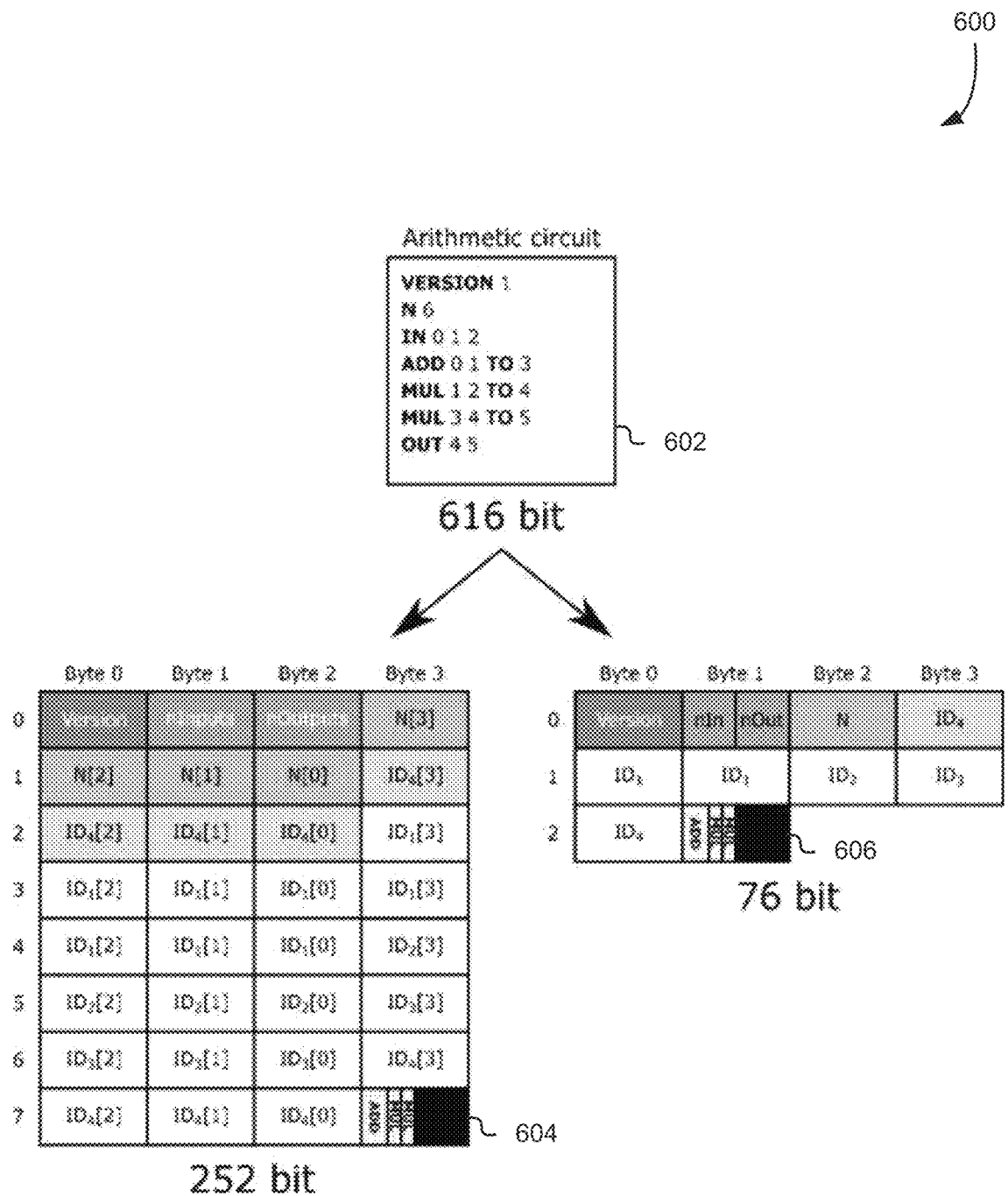
FIG. 6 illustrates a diagram of circuit serialisation in accordance with at least one embodiment.

FIG. 6 illustrates a diagram 600 of circuit serialisation. The input arithmetic circuit 602 on top is represented in ASCII. The first serialised circuit 604, in an embodiment, is the result of applying serialisation techniques where $n_w=32$ and the second serialisation circuit 606 is the result of apply serialisation techniques where $n_w=8$. The solid black boxes represent unused bits which, in an embodiment, are zero-padded.

In an embodiment, the rules for simplification of data fields and entropy coding of the arithmetic operations are utilised to construct an efficient serialisation of arithmetic circuits. The header of this data structure may include: a version byte, an integer (e.g., signed or unsigned) value for the number of inputs/outputs, the number of wires, the list of output wire identifiers except the last one (as described in connection the simplification rules, the last output wire identifier may be omitted while still achieving lossless compression), and combinations thereof. In an embodiment, the version byte embeds the configuration which is valid for a specific circuit. The recipient of a serialised circuit may use the version byte to determine how to de-serialise the serialised circuit. For example, the version byte (or bytes) may be structured as follows:

Bit 0 and 1: Instruction set Instruction sets defining the type of instructions which are defined for the circuit. Addition and multiplications are always defined, but additional operators may be defined according to the circuit functionality, e.g. wire compression, wire expansion, equal-to-zero and compare-to-zero operators. Therefore, the following configurations could be introduced:

00: Instruction set with M=2 types of operators.
01: Instruction set with M=4 types of operators.
10: Instruction set with M=8 types of operators.
11: Instruction set with M=16 types of operators.

Bit 2, 3 and 4: Number of inputs/outputs. This field specify the bit width of the fields containing the number of inputs and the number of outputs. For instance, the following configurations could be introduced:

000: 2 bit input, 2 bit output.
001: 2 bit input, 4 bit output.
010: 2 bit input, 8 bit output.
011: 4 bit input, 2 bit output.
100: 4 bit input, 4 bit output.
101: 4 bit input, 8 bit output.
110: 8 bit input, 4 bit output.
111: 8 bit input, 8 bit output.

Bit 5 and 6: Wire identifiers width $n_w$. Depending on the number of wires in the circuit N, a specific number of bit can be allocated to encode the wire identifiers. For instance, the following configurations could be introduced:

00: Wire identifiers and N encoded in 8 bit.
01: Wire identifiers and N encoded in 16 bit.
10: Wire identifiers and N encoded in 32 bit.
11: Wire identifiers and N encoded in 64 bit.

Bit 7: Bit-width $n_{bit}$ The circuit could be optimised for a specific computer architecture. For instance, the following configurations could be introduced:

0: 32-bit architecture.
1: 64-bit architecture.

In some embodiments, more bytes can be reserved to the version information, enabling the definition of additional configurations and fields.

The instruction set field may be used for the selection of the right dictionary for entropy coding. If a specific number of dictionaries is pre-defined, the right dictionary does not need to be encoded in the circuit. For instance, if *M* is a power of 2, then the scheme with symbol probabilities specified above can be defined. Therefore, given a specific instruction set, a specific dictionary can be retrieved.

In an embodiment, the body of the circuit contains the serialised wire identifiers of the input gates and the gate types. In an embodiment, the size of the wire identifiers is predefined and encoded in an integer number of bytes, so the wire identifiers are encoded first, and then the encoded gates are embedded. This may result in more efficient serialisation and de-serialisation, such as in architectures where data fields may need to be padded to the nearest full byte. It should be noted that advanced coding schema may be also applied and wire identifies are not required to be coded in an integer number of bytes, according to at least one embodiment. During the de-serialisation, the receiver knows the value of N from the header. After reading the wire identifiers, the remaining bit stream represents the coded arithmetic operations. Encoded gates may not aligned to bytes, however multiple gates can be embedded in a single byte using bit-wise operations. For instance, given two symbols $a_1$ and $a_2$ independently encoded in 4 bits, a single byte b can be used to aggregate the information:

$$b=(a_1<<4)+a_2$$

The bit-wise operator '<<' is a left shift. Gates can be also split between two or more bytes, depending on the specific dictionary.

In an embodiment, an entropy coder builds the codes in such a way that the decoder is able to detect where each symbol code starts and ends. Therefore, the right wire identifiers are sequentially assigned to each arithmetic operation depending on the required number of inputs. For instance, if the next wire to read is the $i^{th}$ in the sequence and the next operator start at bit j in the stream, the following actions are performed:

1. Detect symbol $a_j$ with first bit at position j.
2. Compute symbol size $s(a_j)$ using information from the dictionary.
3. Compute number of input wires $n(a_j)$ for symbol $a_j$.
4. Store the arithmetic operation with code $a_i$ and wire identifiers (i, i+1, . . . , i+n($a_i$)−1).
5. Move the pointer to the next symbol to $j+s(a_j)$.
6. Move the counter to the next wire to $i+n(a_j)$.

In an embodiment, the process ends when N wires have been read. If the stream was properly encoded, the pointer to the next symbol is the end of the stream when the $N^{th}$ wire is read. In an embodiment, the last symbol may not be aligned to the byte, and padding may be used to align the last symbol, e.g. using zero-padding, one-padding or zero-one-padding.

Thus, FIG. 6 illustrates, in an embodiment, a comprehensive example for the serialisation process where we consider a dictionary with M=3 and the initial arithmetic circuit coded in ASCII (i.e., $n_o$=8). A Huffman code may be utilized in connection with the serialisation process. For example, according to a Huffman code, the most frequent operation is coded as a one-bit value (e.g., MU L is encoded as '0'), the second most frequent operation is coded as a two-bit value (e.g., ADD is encoded as '10'), and so on (e.g., a third operation is coded as '11'). The compression ratio respect to the ASCCI coding is 2.44 if $n_w$=32 and 8.11 if $n_w$=8.

Figure 7:
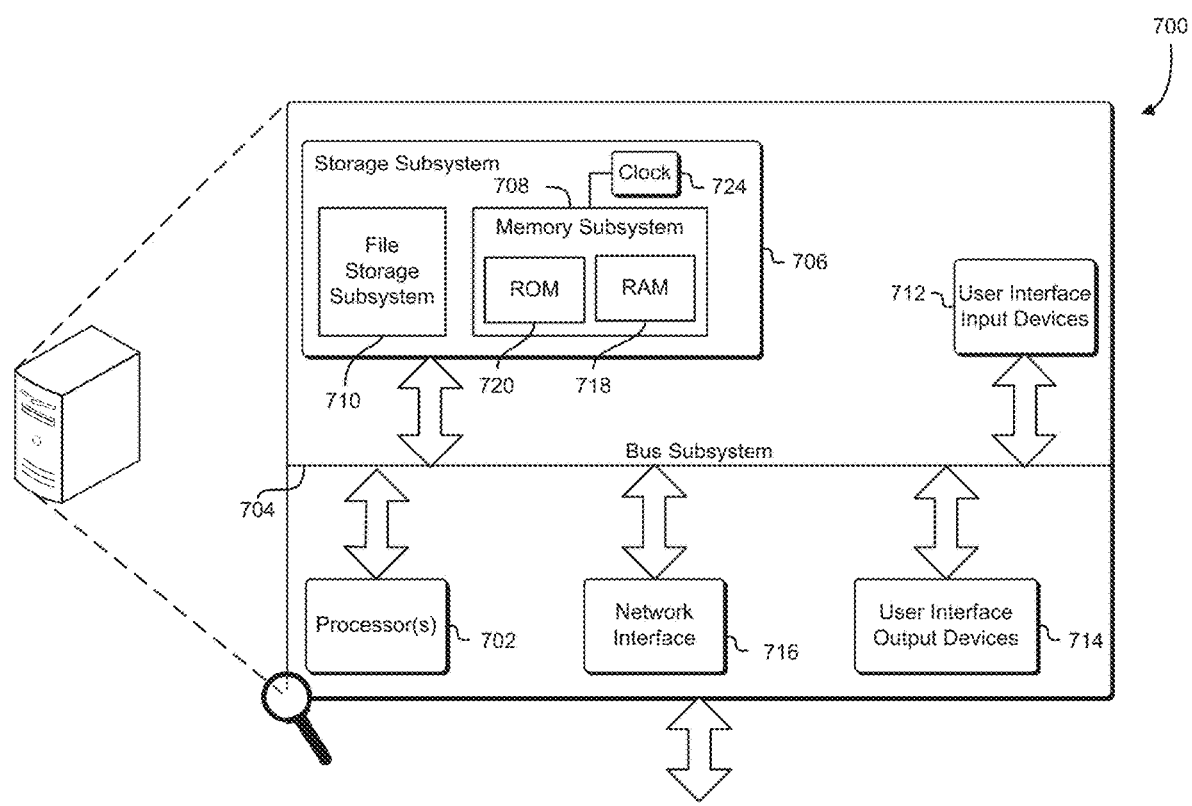
FIG. 7 illustrates a computing device that can be used to practice at least one embodiment of the present disclosure.

FIG. 7 is an illustrative, simplified block diagram of a computing device 700 that can be used to practice at least one embodiment of the present disclosure. In various embodiments, the computing device 700 can be used to implement any of the systems illustrated and described above. For example, the computing device 700 can be configured for use as a data server, a web server, a portable computing device, a personal computer, or any electronic computing device. As shown in FIG. 7, the computing device 700 could include one or more processors 702 that, in embodiments, are configured to communicate with and are operatively coupled to a number of peripheral subsystems via a bus subsystem 704. In some embodiments, these peripheral subsystems include a storage subsystem 706 comprising a memory subsystem 708 and a file/disk storage subsystem 710, one or more user interface input devices 712, one or more user interface output devices 714, and a network interface subsystem 716. Such storage subsystem 706 could be used for temporary or long-term storage of information.

In some embodiments, the bus subsystem 704 provides a mechanism for enabling the various components and subsystems of computing device 700 to communicate with each other as intended. Although the bus subsystem 704 is shown schematically as a single bus, alternative embodiments of the bus subsystem utilize multiple busses. In some embodiments, the network interface subsystem 716 provides an interface to other computing devices and networks. The network interface subsystem 716, in some embodiments, serves as an interface for receiving data from and transmitting data to other systems from the computing device 700. In some embodiments, the bus subsystem 704 is utilised for communicating data such as details, search terms, and so on.

In some embodiments, the user interface input devices 712 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 700. In some embodiments, the one or more user interface output devices 714 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 700. The one or more user interface output devices 714 can be used, for example, to present user interfaces to facilitate user interaction with applications performing processes described and variations therein, when such interaction may be appropriate.

In some embodiments, the storage subsystem 706 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 706. These application modules or instructions can be executed by the one or more processors 702. In various embodiments, the storage subsystem 706 additionally provides a repository for storing data used in accordance with the present disclosure. In some embodiments, the storage subsystem 706 comprises a memory subsystem 708 and a file/disk storage subsystem 710.

In embodiments, the memory subsystem 708 includes a number of memories, such as a main random access memory (RAM) 718 for storage of instructions and data during program execution and/or a read only memory (ROM) 720, in which fixed instructions can be stored. In some embodiments, the file/disk storage subsystem 710 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 700 includes at least one local clock 724. The local clock 724, in some embodiments, is a counter that represents the number of ticks that have transpired from a particular starting date and, in some embodiments, is located integrally within the computing device 700. In various embodiments, the local clock 724 is used to synchronize data transfers in the processors for the computing device 700 and the subsystems included therein at specific clock pulses and can be used to coordinate synchronous operations between the computing device 700 and other systems in a data centre. In another embodiment, the local clock is a programmable interval timer.

The computing device 700 could be of any of a variety of types, including a portable computer device, tablet computer, a workstation, or any other device described below. Additionally, the computing device 700 can include another device that, in some embodiments, can be connected to the computing device 700 through one or more ports (e.g., USB, a headphone jack, Lightning connector, etc.). In embodiments, such a device includes a port configured to accept a fibre-optic connector. Accordingly, in some embodiments, this device is configured to convert optical signals to electrical signals that are transmitted through the port connecting the device to the computing device 700 for processing. Due to the ever-changing nature of computers and networks, the description of the computing device 700 depicted in FIG. 7 is intended only as a specific example for purposes of illustrating the preferred embodiment of the device. Many other configurations having more or fewer components than the system depicted in FIG. 7 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising", "having", "including", and "containing" are to be construed as open-ended terms (i.e., meaning "including, but not limited to") unless otherwise noted. The term "connected", when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset", unless otherwise noted or contradicted by context, is to be construed as a nonempty collection comprising one or more members.

Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C", or "at least one of A, B and C", unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited herein are hereby incorporated by reference to the same extent as if each reference were individually and specifically indicated to be incorporated by reference and were set forth in its entirety herein. This includes UK patent application numbers: GB 1719998.5, GB 1718505.9, GB 1720768.9

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like do not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

The invention claimed is:

1. A computer-implemented method comprising:
   at a client node, compiling a computation $\mathcal{P}$ into an arithmetic circuit $\mathcal{C}$ comprising wires that carry values from a field $\mathbb{F}$ and connect to addition and multiplication gates, further comprising supplying the arithmetic circuit $\mathcal{C}$ and an input x to a worker node;
   at the worker node, executing the arithmetic circuit $\mathcal{C}$ on the input x, resulting in an output $y$, encoding a transcript for $\{\mathcal{C}, x, y\}$, and providing the output y to the client node, wherein a valid transcript for $\{\mathcal{C}, x, y\}$ is an assignment of values to circuit wires such that the values assigned to input wires are those of x, intermediate values correspond to a correct operation of a plurality of gates in $\mathcal{C}$, and values assigned to output wire(s) $y$; and
   at a verifier node, validating a blockchain transaction.

2. The computer-implemented method of claim 1, wherein the arithmetic circuit is a physical circuit having wires and logic gates.

3. The computer-implemented method of claim 1, wherein the arithmetic circuit is a DAG, and the wires are edges in the DAG.

4. The computer-implemented method of claim 1, wherein from the circuit $\mathcal{C}$, a quadratic program $Q$ is generated that includes a set of polynomials that provide a complete description of the original circuit $\mathcal{C}$.

5. The computer-implemented method of claim 4, wherein public parameters are generated to be used by the worker node and the verifier node in performing and verifying the quadratic program.

6. The computer-implemented method of claim 1, further comprising deriving a public evaluation key EK and a public verification key VK using a secret value s selected by or from the client node.

7. The computer-implemented method of claim 6, wherein the worker node uses the public evaluation key and the public verification key to evaluate the computation on a particular input x.

8. The computer-implemented method of claim 7, wherein the output $y$, values of internal circuit wires, and EK are used to produce a proof-of-correctness $\pi$.

9. The computer-implemented method of claim 8, wherein the proof-of-correctness $\pi$ is stored on a blockchain and verified by the verifier node without requiring the worker node to separately interact with the verifier node.

10. The computer-implemented method of claim 8, wherein the verifier node validates the payment transaction using the public verification key VK and the proof-of-correctness $\pi$.

11. A system comprising:
a client node, a worker node, and a verifier node each comprising a processor and a memory including executable instructions that, as a result of execution by the processor, cause the system to:
- at the client node, compile a computation $\mathcal{P}$ into an arithmetic circuit $\mathcal{C}$ comprising wires that carry values from a field $\mathbb{F}$ and connect to addition and multiplication gates, supply the arithmetic circuit $\mathcal{C}$ and an input x to the worker node;
- at the worker node, execute the arithmetic circuit $\mathcal{C}$ on the input x, outputting $\mathcal{y}$, encode a transcript for $\{\mathcal{C}, x, \mathcal{y}\}$, and provide the output $\mathcal{y}$ to the client node, wherein a valid transcript for $\{\mathcal{C}, x, \mathcal{y}\}$ is an assignment of values to circuit wires such that the values assigned to input wires are those of x, intermediate values correspond to a correct operation of a plurality of gates in $\mathcal{C}$, and values assigned to output wire(s) is $\mathcal{y}$; and
- at the verifier node, validate a blockchain transaction.

12. The system of claim 11, wherein the arithmetic circuit is a physical circuit having wires and logic gates.

13. The system of claim 11, wherein the arithmetic circuit is a DAG, and the wires are edges in the DAG.

14. The system of claim 11, wherein from the circuit $\mathcal{C}$, a quadratic program $\mathcal{Q}$ is generated that includes a set of polynomials that provide a complete description of the original circuit $\mathcal{C}$.

15. The system of claim 14, wherein public parameters are generated to be used by the worker node and the verifier node in performing and verifying the quadratic program.

16. The system of claim 11, further comprising deriving a public evaluation key EK and a public verification key VK using a secret value s selected by or from the client node.

17. The system of claim 16, wherein the worker node uses the public evaluation key and the public verification key to evaluate the computation on a particular input x.

18. The system of claim 17, wherein the output $\mathcal{y}$, values of internal circuit wires, and EK are used to produce a proof-of-correctness $\pi$.

* * * * *